United States Patent

Davis

[15] 3,656,734
[45] Apr. 18, 1972

[54] PIPE CUTTING DEVICES AND METHODS OF MAKING AND USING THE SAME

[72] Inventor: William F. Davis, 6234 Langdon Court, Berkeley, Mo. 63134

[22] Filed: Oct. 8, 1969

[21] Appl. No.: 864,635

[52] U.S. Cl...................266/23 N, 266/23 NN, 266/23 B, 219/125 PL
[51] Int. Cl........................................B23k 7/10
[58] Field of Search..................266/23 N, 23 NN, 23 B; 219/124, 125 PL, 68, 69 M; 269/289.1

[56] References Cited

UNITED STATES PATENTS 3,076,889   2/1963   Enk..............................219/125 PL
3,171,012   2/1965   Morehead......................266/23 B
3,281,047   10/1966  Weicht...........................219/125 PL Primary Examiner—Leonidas Vlachos
Attorney—Roger M. Hibbits

[57] ABSTRACT

The present invention relates to devices for cutting pipes and similar articles which automatically maintain a uniform longitudinal position between the cutting torch and the article to be cut comprising means for detecting longitudinal shift between said torch and the transverse plane of cut of a pipe while it is being cut peripherally and means for minimizing any error or shift.

4 Claims, 10 Drawing Figures

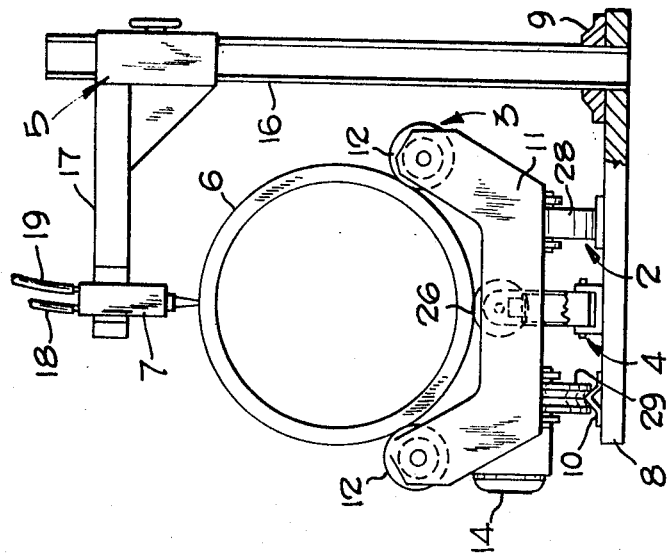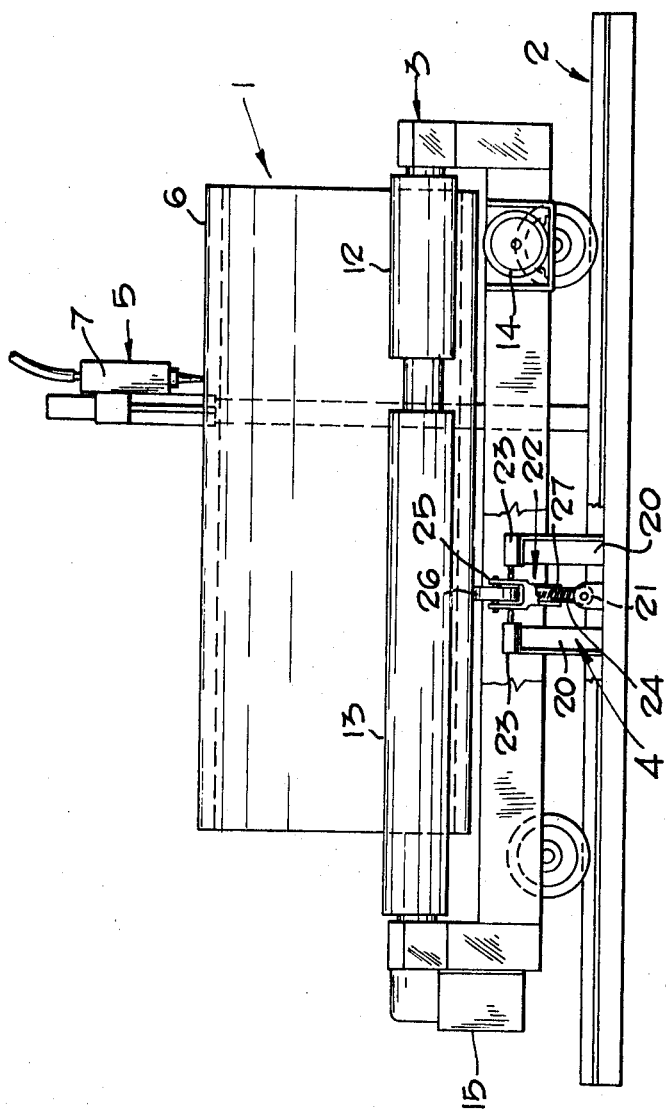

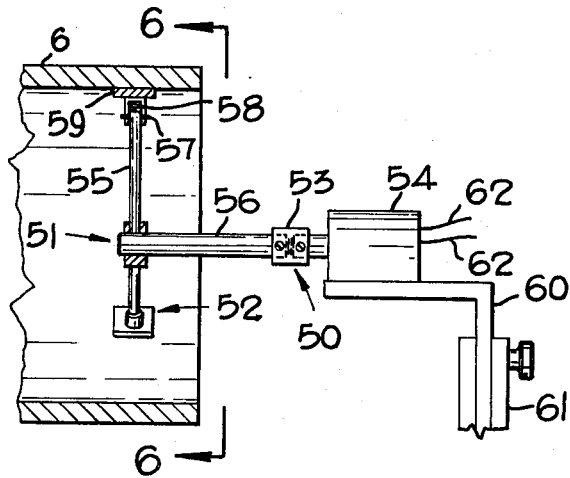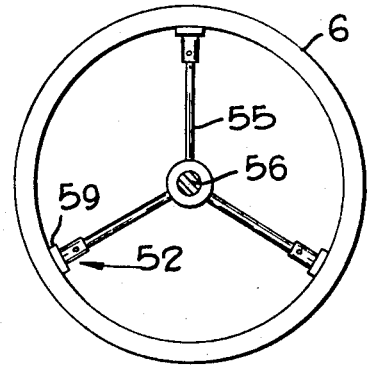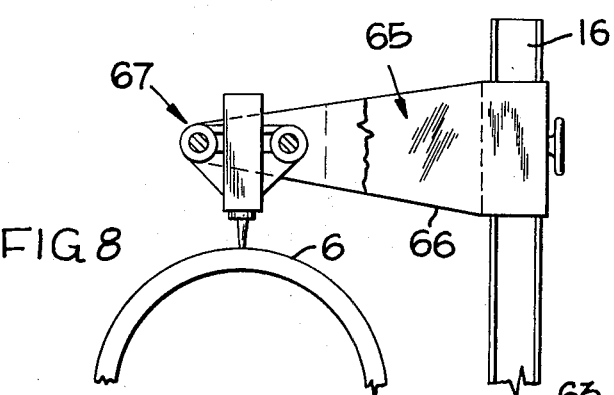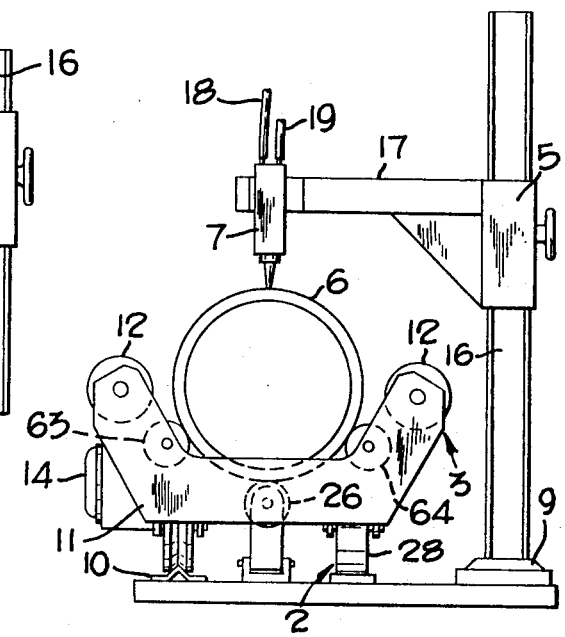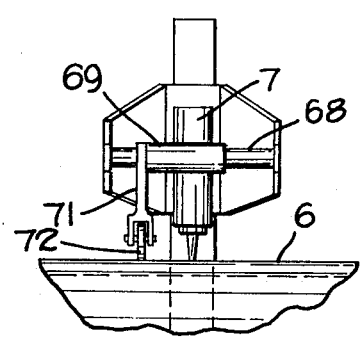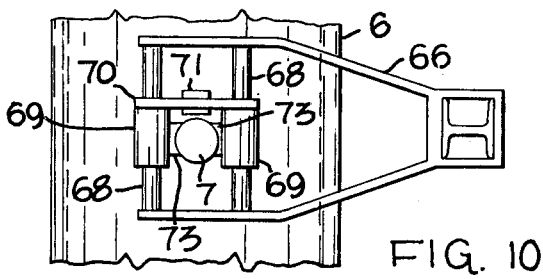
Inventor
WILLIAM F. DAVIS 3,656,734

PIPE CUTTING DEVICES AND METHODS OF MAKING AND USING THE SAME

BACKGROUND OF THE INVENTION

In cutting large elongated objects, such as pipes, using a cutting torch of the oxygen-acetylene type it is customary to fix the position of the torch near the peripheral surface of such object and then while maintaining the torch in a cutting position relative to said object, the object is then rotated about its longitudinal axis.

In devices used for the foregoing purpose, as the object is rotated while being cut it has a tendency to "walk" or move in a longitudinal direction thus resulting in cuts which are not square.

To overcome this common problem prior devices have used such techniques as gravity feed or complex torch mounting apparatus.

SUMMARY OF THE INVENTION

It is therefore an object of the present invention to provide a pipe cutting device which will assure a square cut of such pipe in a simple and economical manner.

A further object of the present invention is to provide a pipe cutting device which supports the pipe being cut, rotates said pipe, senses any longitudinal movement of said pipe during cutting and automatically repositions said pipe.

A further object of the present invention is to provide a pipe cutting device which supports the cutting torch in proximate position to said pipe, senses any longitudinal movement of said pipe during cutting and automatically repositions said torch to minimize relative longitudinal displacement between said torch and the transverse line of cut.

These together with other objects and advantages, which will become subsequently apparent, reside in the details and construction and operation as more fully hereinafter described and claimed, reference being had to the accompanying drawings forming a part hereof, wherein like numerals refer to like parts throughout, and in which;

BRIEF DESCRIPTION OF THE DRAWINGS

In the drawings:

FIG. 1 is an elevation view of a pipe cutting device constructed in accordance with and embodying the present invention.

FIG. 2 is a side elevation view of the pipe cutting device shown in FIG. 1.

FIG. 3 is an elevation view of another pipe cutting device constructed in accordance with and embodying the present invention.

FIG. 6 is a partial end view of the device shown in FIG. 5.

FIG. 7 is a side elevation view of another pipe cutting device constructed in accordance with and embodying the present invention.

FIG. 8 is an elevation view of a pipe cutting device constructed in accordance with and embodying the present invention.

FIG. 9 is another elevation view of the pipe cutting device shown in FIG. 8.

FIG. 10 is a plan view of the pipe cutting device shown in FIG. 8.

DETAILED DESCRIPTION OF THE INVENTION

Figure 4:
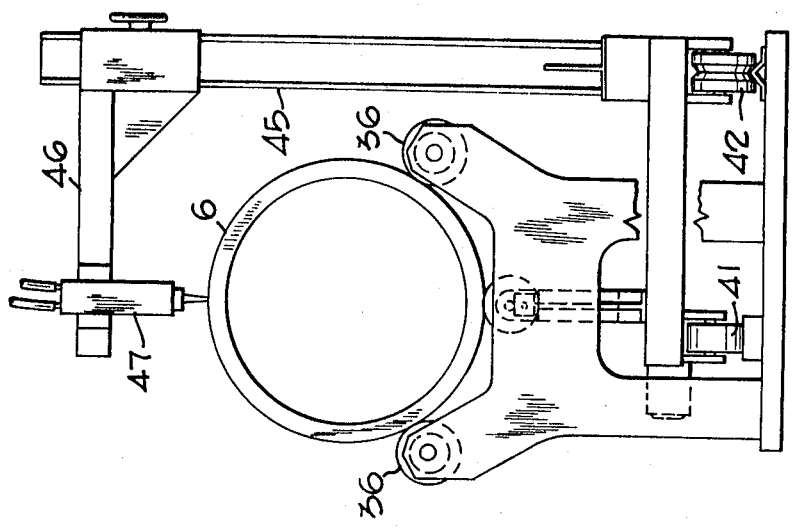
FIG. 4 is a side elevation view of the pipe cutting device shown in FIG. 3.

Referring now in more detail and by reference characters to the drawings which illustrate practical embodiments of the present invention, FIGS. 1 and 2, are elevation views of a pipe cutting device constructed in accordance with and embodying the present invention.

As shown in FIG. 1 and FIG. 2, FIG. 2 being a side elevation view, the pipe cutting device, 1, comprises base structure, 2, carriage, 3, sensor assembly, 4, torch assembly, 5. Pipe, 6, is shown mounted on carriage, 3, in a position to be cut by torch, 7.

Base structure, 2, as shown by the drawings, is seen to comprise base plate, 8, support bracket, 9, and way, 10.

Carriage, 3, is seen to comprise carriage frame, 11, rollers, 12, and, 13, carriage drive motor, 14, and roller drive motor, 15.

Torch structure, 5, is seen to comprise vertical member, 16, bracket, 17, and, torch, 7. Torch, 7, is supplied oxygen and acetylene by means of hoses, 18, and, 19.

Sensor means, 4, is seen to comprise mounting brackets, 20, which are mounted on base plate, 8, bracket, 21, extension member, 22, and switches, 23. Extension member, 22, is pivotally mounted on bracket, 21, and comprises spring member, 24, roller support member, 25, and roller, 26. Roller support member, 25, and roller, 26, are forced upwardly by spring, 27, mounted in spring member, 24. Roller, 26, is rotatably mounted to roller support member, 25, as shown in the drawings.

In the operation of the present invention, pipe, 6, is mounted upon carriage, 3. Torch, 7, is then activated and roller drive motor, 15, is energized. Roller drive motor, 15, rotates rollers, 12, and, 13, thereby causing rotation of pipe, 6, about its longitudinal axis. Roller, 26, is in contact with the lower surface of pipe, 6, and as pipe, 6, rotates, roller, 26, rotates and remains in contact with said pipe. As pipe, 6, rotates and walks along the longitudinal axis of said pipe, roller, 26, follows this walking, support member, 22, pivoting about bracket, 21. When pipe, 6, has walked beyond an acceptable limit, switch, 23, is closed supplying power to carriage drive motor, 14. Carriage drive motor, 14, drives carriage, 3, in a direction to reopen the previously closed switch, 23. When carriage drive motor, 14, has driven carriage, 3, sufficiently far to cause member, 22, to return as essentially vertical position, switches, 23, are both open (deactivated) and drive motor, 14, ceases to receive power and carriage, 14, ceases to move in a longitudinal direction.

Carriage, 3, is provided with wheels, 28, and, 29. Wheel, 28, is a flat surfaced wheel and runs along the upper surface of the flat strip provided on base, 8. Wheel, 29, has a beveled outer surface adapted to ride on way, 10, and thereby minimize transverse motion of carriage, 3.

FIGS. 3 and 4, illustrate another embodiment of the present invention. In FIGS. 3 and 4 pipe cutting device, 30, is seen to comprise base, 31, roller support members, 32, and, 33, carriage, 34, roller drive motor, 35, rollers, 36, and, 37, and torch assembly, 38.

Carriage, 34, is seen to comprise carriage frame, 39, with torch assembly, 38, sensor means, 40, and wheels, 41, and, 42. Pipe, 6, is shown on pipe cutting device, 30, and rests on rollers, 36, and, 37. Sensor means, 40, is essentially the same as sensor means, 4, shown in FIG. 1 with the primary change being that support bracket, 43, is used in place of brackets, 20, and, 21. The operation of sensor means, 40, however, is the same.

Torch assembly, 38, comprises vertical member, 45, bracket, 46, and torch, 47. Torch assembly, 38, is essentially the same as that shown in FIGS. 1 and 2.

In operation, pipe cutting device, 30, functions as follows: Pipe, 6, is placed on rollers, 36, and, 37, and is caused to rotate about its longitudinal axis by roller drive motor, 35, and rollers, 36, and, 37. As pipe, 6, is rotated, torch, 47, proceeds to cut through the peripheral surface thereof. As pipe, 6, tends to "walk" in a longitudinal direction roller, 48, on sensor, 40, follows the walking. When pipe, 6, has walked beyond an acceptable limit, carriage drive motor, 44, is activated by means of switches, 49, and associated electric circuitry.

Carriage drive motor, 44, is deactivated when carriage, 34, has been shifted longitudinally of said pipe an amount approximately equal to the distance of the "walk" of pipe, 6, and in the same direction. Carriage, 34, thus tends to follow the "walking" of pipe, 6.

Figure 5:
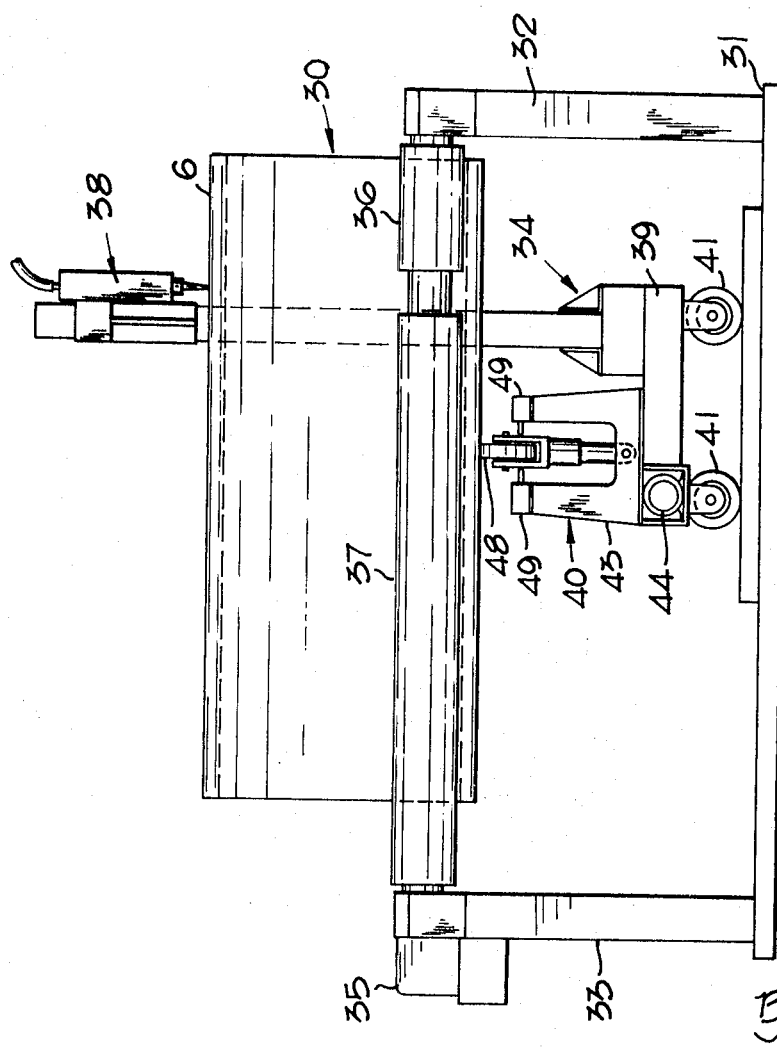
FIG. 5 is a partial sectional elevation view of a pipe cutting device constructed in accordance with and embodying the present invention illustrating another sensor constructed in accordance with and embodying the present invention.

In FIG. 5, sensor, 50, is shown and may be used in place of sensor, 4, shown in FIGS. 1 through 4.

Sensor, 50, comprises web, 51, web feet, 52, shaft coupler, 53, and linear induction sensor, 54. Web, 51, as shown in FIGS. 5 and 6, comprises three web members, 55, forming radials of web, 51, and web shaft, 56. Web members, 55, are seated in web feet, 52, and retained therein by restraining pins, 57. Springs, 58, tend to unseat web members, 55, from housing, 59.

In operation the web portion of sensor is installed in pipe, 6, such that web shaft, 56, rotates true. Linear induction sensor, 54, is coupled to web shaft, 56, by means of shaft coupler, 53. Sensor, 54, is mounted on bracket arm, 60, which is adjustably mounted to column, 61. Column, 61, in the configuration shown in FIGS. 1 and 2 would be mounted on base structure, 2, while in the configuration shown in FIGS. 3 and 4 it would be mounted on carriage, 34. Any "walking" by pipe, 6, with respect to torch, 7, or torch, 47, is sensed by sensor, 54, and a correction therefor is coupled to the appropriate drive motor by means of conductors, 62, and associated electric circuitry.

In FIG. 7 another pipe cutting device is shown which is essentially the same as those previously shown with the exception that rollers, 63, and, 64, are added to carriage, 3. It is easily seen that in this manner, carriage, 3, will accommodate two ranges of pipe size.

FIGS. 8, 9, and 10 illustrate another embodiment of the present invention. In this embodiment it is necessary to retain the roller drive and support functions of previously described embodiments, however, pipe cutting device, 65, is seen to comprise in addition thereto, support arm, 66, which provides support for torch and wheel suspension unit, 67. Torch and wheel suspension unit, 67, comprises cylindrical ways, 68, torch, 7, ball bushings, 69, member, 70, wheel member, 71, and wheel, 72. In this embodiment torch, 7, is suspended between ball bushings, 69, by members, 73. In operation, as pipe, 6, is rotated, wheel, 72, maintains contact with pipe, 6, and fixes the distance of torch, 7, above the peripheral surface of pipe, 6. As pipe, 6, tends to walk longitudinally, wheel, 72, and wheel member, 71, walk with pipe, 6, and thus torch, 7, is caused to follow this walking by the rigid connection between wheel member, 71, and bushings, 69, and between bushings, 69, and torch, 7.

It should be understood that changes and modifications in the form, construction, arrangement, and combination of the elements of the pipe cutting device and methods of making and using the same may be made and substituted for those herein shown and described without departing from the nature and principle of my invention.

Having thus described my invention, what I claim and desire to secure by United States Letters Patent is:

1. A pipe cutting device comprising,
    base means,
    carriage means movable mounted on said base means,
    support means operably mounted on said carriage means, said support means adapted to support and rotate large diameter metal pipe about its longitudinal axis,
    adjustable torch holding means operably mounted on said base means,
    position sensing means operably mounted on said base means, said position sensing means adapted to detect any longitudinal movement of said pipe while said pipe is rotated on said carriage means and to provide a signal indicative thereof,
    drive means operably mounted on said carriage means, said drive means adapted to reposition said carriage means in response to signals from said position sensing means.

2. Position sensing means for sensing longitudinal motion of a hollow cylindrical pipe while said pipe is rotate, comprising,
    a plurality of elongated support members, said support members disposed radially within said pipe and essentially in a plane transverse to the axis of said pipe, one end of said elongated support members in operable contact with the wall of said pipe,
    hub means operably attached to the ends of said elongated support members nearest the axis of said pipe,
    shaft means operably attached to said hub means, said shaft means disposed to lie along the longitudinal axis of said hollow cylindrical pipe,
    linear transducer means operably coupled to said shaft means, said linear transducer means adapted to provide a signal indicative of longitudinal motion of said shaft means and thus longitudinal motion of said pipe.
    roller means rotatably mounted on said roller support member and disposed such that said roller means is in rollable contact with the exterior surface of said pipe, said torch holding means being mounted on said base means to allow free movement parallel to the axis of said pipe so that longitudinal motion of said pipe causes longitudinal movement of said roller means which causes longitudinal movement of said torch holding means.

3. A pipe cutting device comprising, - base means, - support means operably mounted on said base means means said support means adapted to support and rotate large diameter metal pipe about its longitudinal axis, - carriage means movably mounted on said base means, - torch means operably mounted on said carriage means, - position sensing means operably mounted on said carriage means and in movable contact with the exterior surface of said pipe, said position sensing means comprising, - bracket means, - first and second switch means operably mounted upon said bracket means,
    a roller support member pivotally mounted on said bracket means and disposed between said first and second switch means,
    roller means rotatably mounted on said roller support member and disposed such that it is in rollable contact with the exterior surface of said pipe and such that longitudinal motion of said pipe may cause pivoting of said roller support member causing engagement between said roller support member and one of said switch means,
    drive means operably mounted on said carriage means, said drive means adapted to reposition said torch means in response to signals from said position sensing means.

4. A pipe cutting device comprising,
    base means,
    support means operably mounted on said base means, said support means adapted to support and rotate large diameter metal pipe about its longitudinal axis,
    torch holding means operably mounted on said base means,
    position sensing means operably attached to said torch holding means and in movable contact with the exterior surface of said pipe, said position sensing means adapted to sense longitudinal motion of said pipe and cause repositioning of said torch holding means, said position sensing means comprising,
    a roller support member rigidly mounted on said torch holding means,
    roller means rotatably mounted on said roller support member and disposed such that said roller means is in rollable contact with the exterior surface of said pipe, said torch holding means being mounted on said base means to allow free movement parallel to the axis of said pipe so that longitudinal motion of said pipe causes longitudinal movement of said roller means which causes longitudinal movement of said torch holding means.

* * * * *